Jan. 12, 1954  P. ASCHWANDEN ET AL  2,665,472
CUTTER HEAD
Filed July 3, 1951  2 Sheets-Sheet 1

INVENTOR:
Paul Aschwanden
Karl Burri
By Thenderoth, Lind + Ponack
Attorneys.

INVENTORS:
Paul Aschwanden
Karl Burri

Patented Jan. 12, 1954

2,665,472

UNITED STATES PATENT OFFICE 2,665,472

CUTTER HEAD

Paul Aschwanden and Karl Burri, Zurich, Switzerland, assignors to Verwaltungsgesellschaft der Werkzeugmaschinenfabrik Oerlikon, Zurich-Oerlikon, Switzerland Application July 3, 1951, Serial No. 234,926

Claims priority, application Switzerland July 6, 1950

6 Claims. (Cl. 29—105)

The present invention relates to cutter heads and more particularly to cutter heads for spiral bevel gears.

One object of the invention is to provide a cutter head of the said kind which permits rapid and precise machining of the tooth flanks of the spiral bevel gear and which permits comparatively high speeds of rotation of the tool and of the work piece.

Another object of the invention is to provide a method by which such a cutter head may easily be produced.

Other objects and advantages of the invention will become apparent from the description now to follow of some embodiments thereof with reference to the accompanying drawings, in which.

Figure 1:
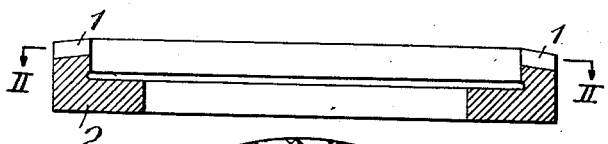
Fig. 1 is an axial section through a first cutter head.
Figure 2:
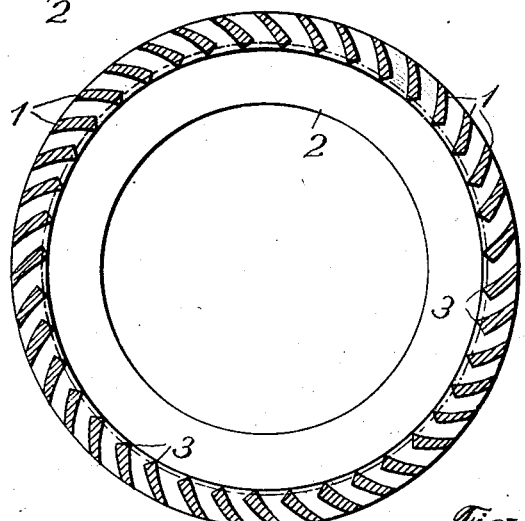
Fig. 2 is a section on line II—II through the cutter head of Fig. 1.

The tool or cutter head represented in Figs. 1 and 2 comprises a body 2 which is integral with the blades 1, which latter have been produced on a spiral bevel gear cutting machine. The tool has a shape similar to that of a spiral bevel gearwheel, the teeth of which form the blades of the tool, which blades are arranged on the circumference of the disc-shaped body 2. The body is constructed so that it can be mounted on the rotary tool holder of a gear machining device which is constructed for cutting spiral bevel gears according to the continuous dividing method in which there is a definite ratio between the speed of rotation of the rotating work piece and that of the rotating tool.

As can be seen from Fig. 2, the cutting edges 3 of the blades 1 are arranged in a circle around the axis of rotation of the tool, on that side of the tool blades 1 which faces the said axis of rotation.

Figure 3:
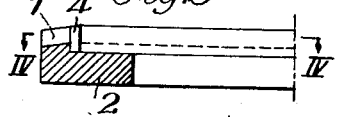
Fig. 3 is an axial section through another cutter head.
Figure 4:
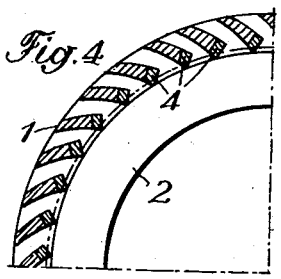
Fig. 4 is a section on line IV—IV through the cutter head of Fig. 3.

In the cutter head shown in Figs. 3 and 4, the cutting blades 1 are lined with hard metal tips 4; otherwise, the construction of this tool is similar to that shown in Figs. 1 and 2.

Figure 5:
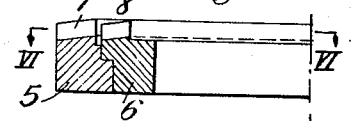
Fig. 5 is an axial section through a third cutter head.
Figure 6:
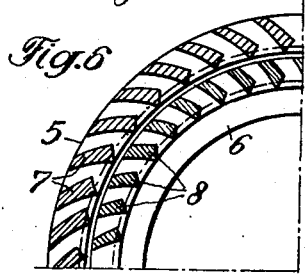
Fig. 6 is a section on line VI—VI through the cutter head of Fig. 5.

The cutter head shown in Figs. 5 and 6 consists of two annular parts 5 and 6, concentrically arranged within each other and of similar shape as that of a spiral bevel gearwheel; the annular parts 5 and 6 are manufactured integrally with their blades 7, 8, e. g. on a spiral bevel gear cutting machine. The cutting edges of the two rows of blades which are arranged in circles around the axis of rotation of the tool are on that side of each blade which faces the said axis of rotation. It will be noted in this connection that the blades 8 on the inner annular part 6 are shaped as roughing blades and engage the work piece before the blades 7 of the outer annular part 5 do so, in order to take the roughing cut.

Figure 7:
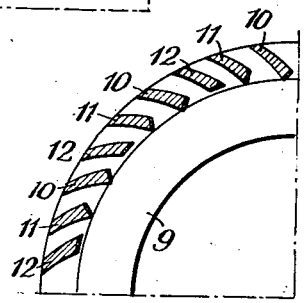
Fig. 7 is a section analogous to that of Fig. 6, through a fourth embodiment of the invention.

A fourth example of a cutter head is represented in Fig. 7. Its body 9 carries blades 10, 11 and 12 arranged by groups on its circumference. Each blade is lined with hard metal and the cutting edges of the blades are arranged in concentric circles around the axis of rotation of the tool, on that side of the blade which faces the said axis of rotation. 10 are the roughing blades, 11 the inward cutting blades and 12 the outward cutting blades. Consequently, the blades 10 serve for taking the roughing cut on both tooth flanks of the tooth gaps, the blades 11 serve for cutting the convex flanks of the teeth, and the blades 12 serve for cutting the concave flanks of the teeth. The blades 10, 11 and 12 may be integral with the body 9 and they may be produced, e. g., on a spiral bevel gear cutting machine, or they may be secured to the main body 9 individually or suitably grouped together.

Figure 8:
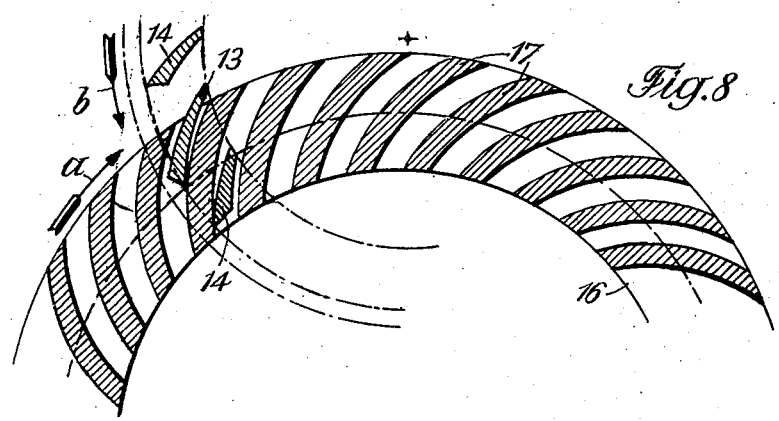
Fig. 8 shows a cutter head having its blades arranged in groups, represented in operation while producing a spiral bevel gear.
Figure 9:
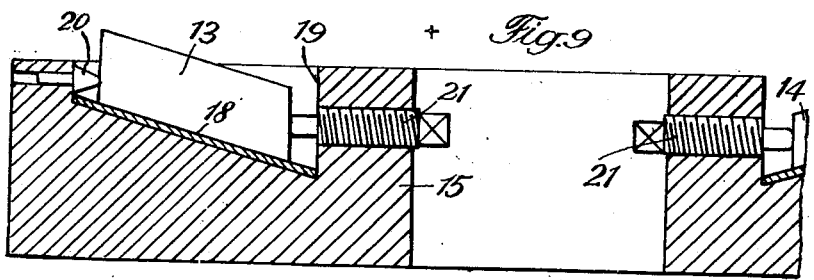
Fig. 9 is an axial section at larger scale, through the cutter head shown in Fig. 8.

Figs. 8 and 9 represent a cutter head having blades 13, 14 arranged in groups, Fig. 8 showing the tool in operation while cutting a spiral bevel gearwheel and Fig. 9 showing the way in which the blades are fixed to the body 15. The work piece to be machined, shown as a crown gear, is indicated at 16, and its teeth at 17. Arrows $a$ and $b$ in Fig. 8 show, by way of example, the respective directions of rotation of the work piece and of the tool. The inward and outward cutting blades 13 and 14, respectively, rest on a supporting plate 18 in recesses 19 of the body 15, their cutting edges being on that side of the blades which is remote from the axis of rotation of the tool. With their outer end faces, the blades are applied against an adjustable abutment 20, and they are clamped in their positions by tightening screws 21.

The operation of this tool is as follows:

Before the cutting operation, both the speeds of rotation and the relative positions of the tool and the work piece are adjusted. When the tool and the work piece rotate in the direction of rotation indicated by arrows a and b, the two blades 13 and 14 forming one group engage one after the other the corresponding flanks of a tooth 17, whereupon the next group of blades 13, 14 engages a subsequent tooth for machining it.

In addition to its rotary motion, the tool is movable in a known way about an axis (which is identical with the axis of the so-called ideal crown gear) which is excentric to its axis of rotation, the adjustment of the tool in relation to that excentric axis being such that the outward cutting blades 14 come into engagement before the inward cutting blades 13 do so. The number of blades of the tool is chosen in such a way that the number of teeth of the crown gear has no common factors with the number of blades of the tool, excepting the factor 1.

Figure 10:
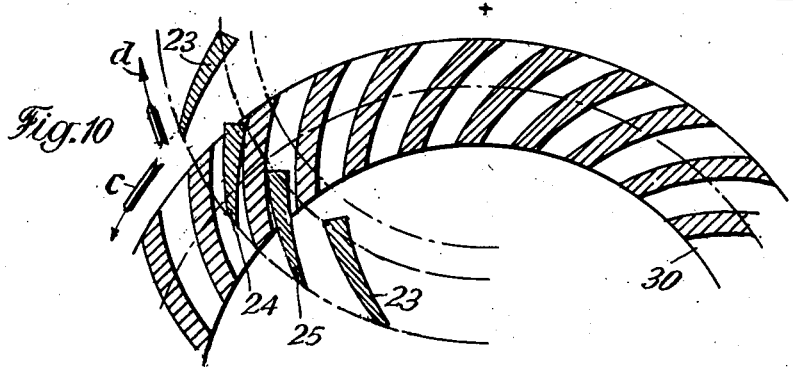
Fig. 10 shows still another cutter head having its blades arranged in groups, represented in operation while producing a spiral bevel gear.
Figure 11:
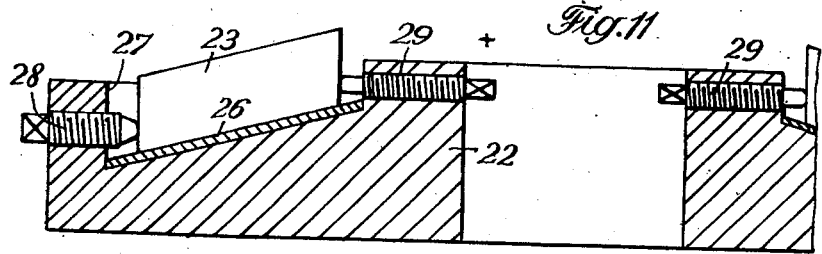
Fig. 11 is an axial section at larger scale through the cutter head shown in Fig. 10.

Figs. 10 and 11 show a cutter head whose body 22 carries blades 23, 24 and 25 arranged in groups as are those in Figs. 8 and 9. The blades rest on supporting plates 26 in recesses 27 of the body 22 and are clamped between an adjustable abutment 28 and a tightening screw 29. As can be seen in the drawing, the cutting edges of all blades are arranged in circles around the axis of rotation of the tool and are situated on that side of the blades which faces the said axis of rotation. 23 indicates the roughing cutter, 24 the inward cutter and 25 the outward cutter.

The cutter head shown in Figs. 10 and 11 operates as follows: The tool again is movable, in addition to its rotation, about an axis situated excentrically of its axis of rotation. Before the cutting operation the tool is adjusted in such a way that, when the tool and the work piece rotate in the directions indicated by arrows c and d (Fig. 10), respectively, at first only the roughing blades 23 come into effect. Roughing of both tooth flanks of a tooth gap of the spiral bevel gear to be manufactured then occurs simultaneously by both cutting edges of the blades 23. As the number of groups of blades is chosen in such a way that the number of teeth of the crown gear indicated at 30 in Fig. 10 has no common factors with the number of groups of blades, excepting the factor 1, each tooth gap of the gearwheel to be produced is thus roughed. When the roughing cut by the blades 23 of each group of blades is terminated, and on account of the aforementioned motion of the tool about the said axis which is excentrical to the axis of rotation of the tool, the inward cutting blades 24 and the outward cutting blades 25 engage one after the other the corresponding convex and concave flanks, respectively, of all teeth of the gearwheel to be produced, whereby machining of the latter is terminated.

As is evident from the above, the cutting edges of the tool blades may form identical groups in which the cutting edges of the blades in each group may be unequally spaced from the axis of rotation of the tool, as is the case in the embodiments shown in Figs. 7 to 11.

We claim:

1. A cutter head for cutting spiral bevel gears and the like according to a continuous dividing method with the speeds of rotation of the rotating work piece and of the rotating cutter having a definite relation to each other, comprising an annular member, cutter blades on said member, said cutter blades having curved lateral faces and being shaped like teeth of curved tooth bevel gears, said curved cutter blades being arranged side by side along said annular member and forming curved gaps between opposite lateral faces of adjacent blades corresponding to the tooth gaps of a curved tooth bevel gear wheel, and the top faces of said tooth-shaped annularly arranged blades being situated on a common cone surface.

2. A cutter head for cutting spiral bevel gears as claimed in claim 1, a hard metal tip fixed on each of said blades, each of said hard metal tips having at least one cutting edge and said cutting edges being arranged in at least one circle centered on the axis of rotation of the cutter head.

3. A cutter head for cutting spiral bevel gears as claimed in claim 1, said annular member comprising an outer annular body carrying a number of outer cutter blades, an inner annular body concentrically inserted in said outer annular body and carrying a similar number of inner cutter blades, each pair of one outer and one inner cutter blade being shaped and arranged to lie together entirely within the profile of a tooth of a spiral bevel gear wheel adapted for meshing with the gears to be cut by the cutter head and which has a number of teeth equal to the number of such pairs of blades and the same leading dimensions as the said cutter head, each of the said blades having at least one cutting edge, the cutting edges of the said outer blades being arranged in one circle and the cutting edges of the said inner blades being arranged in another circle, both these circles being centered on the axis of rotation of the cutter head.

4. In a cutter head for cutting spiral bevel gears, as claimed in claim 1, said annular body carrying a set of circularly arranged cutter blades of a first kind and a set of circularly arranged cutter blades of a second kind, one blade of the first kind alternating with one blade of the second kind, each of the said blades of both kinds being shaped and arranged to lie entirely within the profile of a tooth of a spiral bevel gear wheel which is adapted for meshing with the gears to be cut by the cutter head and which has a number of teeth equal to the total number of blades of the said cutter head and the same leading dimensions as the latter, each of the said blades having at least one cutting edge, the cutting edges of the said blades of the first kind being arranged in one circle centered on the axis of rotation of the cutter head and substantially in the concave flank of its said tooth of the said ideal spiral bevel gear wheel, and the cutting edges of the said blades of the second kind being arranged in another circle centered on the said axis and substantially in the convex flank of its said tooth.

5. In a cutter head for cutting spiral bevel gears as claimed in claim 1, said annular body having blade lodgings each with an inner and an outer end face parallel to the axis of the body and with a plane bottom sloping into said body from the said outer end face towards the said inner end face of the lodging, a spacing plate on each said bottom, said cutter blades having an inner and an outer end face parallel to the said axis and a base face in contact with said spacing plate, the said outer end face of the blade having at least one cutting edge substantially parallel to the said axis and projecting from the annular body, an outer abutment member located in said annular body and projecting into said lodging through the outer end face thereof to provide an abutment for said outer end face of the said cutter blade, an inner abutment member located in said annular body and projecting into said lodging through the inner end face thereof to provide an abutment for said inner end face of the said cutter blade, the said abutment members being mutually offset in the direction of slope of the said bottom and at least one of said abutment members being adjustable in a direction perpendicular to the said axis for clamping the said cutter blade between the said abutment members and against said spacing plate.

6. In a cutter head for cutting spiral bevel as claimed in claim 1, said annular body having blade lodgings each with an inner and an outer end face parallel to the axis of the body and with a plane bottom sloping into said body from the said inner towards the said outer end face of the lodging, a spacing plate on each said bottom, said cutter blades having an inner and an outer end face parallel to the said axis and a base face in contact with said spacing plate, the said inner end face of the blade having at least one cutting edge substantially parallel to the said axis and projecting from the annular body, an outer abutment member located in said annular body and projecting into said lodging through the outer end face thereof to provide an abutment for said outer end face of the said cutter blade, an inner abutment member located in said annular body and projecting into said lodging through the inner end face thereof to provide an abutment for said inner end face of the said cutter blade, the said abutment members being mutually offset in the direction of slope of the said bottom, and at least one of said abutment members being adjustable in a direction perpendicular to the said axis for clamping the said cutter blade between the said abutment members and against said spacing plate.

PAUL ASCHWANDEN.
KARL BURRI.

References Cited in the file of this patent

UNITED STATES PATENTS

| Number | Name | Date |
| --- | --- | --- |
| 1,338,822 | Farnum | May 4, 1920 |
| 1,820,415 | Wildhaber | Aug. 25, 1931 |
| 2,260,605 | Carlsen | Oct. 28, 1941 |
| 2,268,326 | Stewart et al. | Dec. 30, 1941 |
| 2,346,806 | Wildhaber | Apr. 18, 1944 |
| 2,408,787 | Lowell | Oct. 8, 1946 |

FOREIGN PATENTS

| Number | Country | Date |
| --- | --- | --- |
| 11,718 | Netherlands | Sept. 15, 1924 |
| 109,608 | Great Britain | Apr. 25, 1918 |
| 263,721 | Switzerland | Dec. 1, 1949 |
| 264,373 | Switzerland | Jan. 16, 1950 |